United States Patent [19]

Fujiki et al.

[11] Patent Number: 4,507,688

[45] Date of Patent: Mar. 26, 1985

[54] INFORMATION RECORDING APPARATUS

[75] Inventors: Makoto Fujiki, Tokyo; Makoto Takayama, Kanagawa, both of Japan

[73] Assignee: Canon Kabushiki Kaisha, Tokyo, Japan

[21] Appl. No.: 348,838

[22] Filed: Feb. 16, 1982

[30] Foreign Application Priority Data

Feb. 27, 1981 [JP] Japan .................................. 56-27757

[51] Int. Cl.$^3$ ........................ G11B 27/02; G11B 15/02
[52] U.S. Cl. ........................................... 360/13; 360/20
[58] Field of Search ...................... 360/13, 14, 19, 20

[56] References Cited

U.S. PATENT DOCUMENTS 2,909,596 10/1959 Fay ....................................... 360/19.1
3,002,055 9/1961 Gunby ................................... 360/13
3,223,790 12/1965 Brandt .................................. 360/13
3,342,949 9/1967 Wessels ................................ 360/13
4,389,680 6/1983 Gramling ............................ 360/14.1

*Primary Examiner*—Vincent P. Canney
*Attorney, Agent, or Firm*—Toren, McGeady and Stanger

[57] ABSTRACT

Information recording apparatus includes a first recording mechanism for recording information at a certain location on a recording medium such as a tape, and a reproducing mechanism for reproducing the information recorded on the tape. A source of information different from the information recorded on the tape is coupled to mixing circuitry which mixed the information reproduced from the tape by the reproducing mechanism, and the newly generated information, and the combined information is re-recorded by a second recording mechanism at the certain location on the tape.

19 Claims, 11 Drawing Figures

F I G. 2
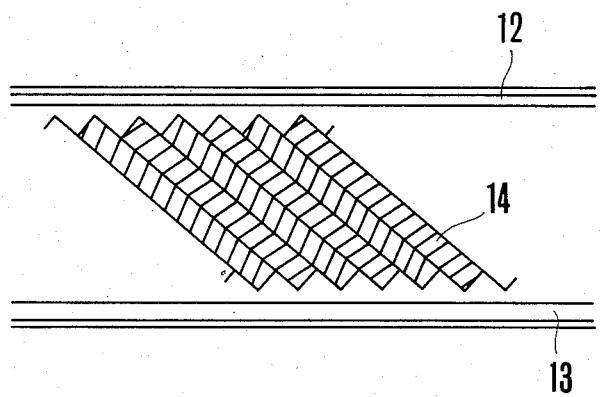
F I G. 3
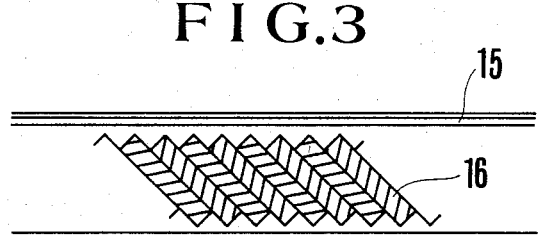
F I G. 4
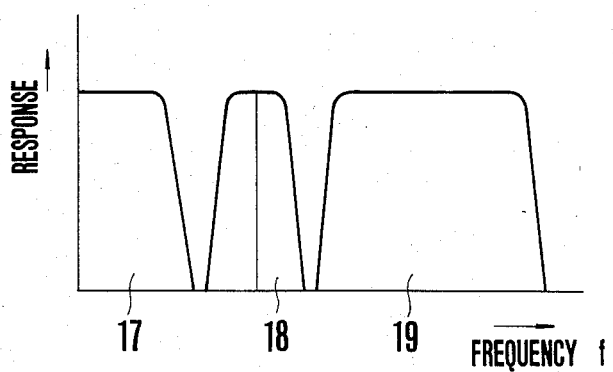

INFORMATION RECORDING APPARATUS

BACKGROUND OF THE INVENTION

1. Field of the Invention

The present invention relates to an information recording apparatus which records information signals such as image information, sound information, and the like on a recording medium, and has a post recording function to add new information to the recording medium on which a recording has been made.

2. Description of the Prior Art

The following specification shall explain the present invention, referring to an example of a video tape recorder (hereinafter referred to as VTR) in which a magnetic tape and rotating magnetic heads are used.

FIG. 1 shows a general arrangement of a conventional VTR. That is, a cassette 1, a magnetic tape 2, rotating magnetic heads 3, 4, a capstan 9, and a pinch roller 8, wherein the tape 2 is held in a pressure contacting manner by the capstan 9 and the pinch roller 8 and is fed in the direction of an arrow 10 with a constant speed. The rotating magnetic heads 3, 4 rotate in the direction of an arrow 11 with a constant speed. Also shown are a total width erasing head 5 for the video tape, a sound erasing head 6, and a fixed head 7 which has a sound recording and reproduction head, and a head to record and reproduce CTL (control) signals.

FIG. 2 shows a tape pattern recorded by the apparatus shown in FIG. 1, including a CTL signal recording track 12, a sound recording track 13, and a track 14 at which image signals are recorded azimuthally. As shown therein, image signals are recorded at a slanted magnetic locus on a running magnetic tape by rotating magnetic heads. Also, sound signals are recorded by a fixed head on a sound track provided at an edge part in the travel direction of the magnetic tape.

In this system, when a post or re-recording is done, sound signals are erased by the sound erasing head 6 which can erase the sound track only, and new sound signals are recorded by the sound recording fixed head for making a post recording.

In order to reduce the amount of magnetic tape consumed and to reduce the size and weight of the tape cassette and the apparatus, the width of the recording locus is made narrower and the running speed of the magnetic tape is made slower by intensifying the recording density of image signals. However, when the running speed of the magnetic tape is extremely slow, it has been difficult to secure sufficient frequency characteristics for the sound signals by the fixed head. Therefore, there has been a method developed to record and reproduce synthesized signals of image signals and sound signals by the same rotating magnetic head or heads.

FIG. 3 shows a tape pattern recorded in such a method, including a CTL (control) signal recording track 15, and a track 16 on which synthesized signals of image and sound are azimuthally recorded.

FIG. 4 is a diagram illustrating an example of zones or bands of image sound signals, including a color signal 17 being converted to a low zone, a brightness signal 19 being FM modulated, and a sound signal 18 being FM modulated.

However, since image signals and sound signals are both synthesized and recorded, it is impossible to make a post recording of sound signals only.

An object of the present invention is to provide an information recording apparatus in which the above-mentioned shortcoming is eliminated.

That is, said object is to provide an information recording apparatus which can record signals obtained by mixing or selecting reproduced information which is recorded at a prescribed position on a recording medium, and new information to be added to the recorded information on the medium, at the prescribed position at which the reproduced information was recorded on the medium.

FIG. 2 represents a recording track pattern on a magnetic tape as recorded by the apparatus of FIG. 1;

FIG. 3 represents a recording track pattern on a magnetic tape wherein synthesized signals of image signals and sound signals are recorded;

FIG. 4 is a diagram showing frequency bands of recorded signals in the method represented by FIG. 3;

Figure 8A:
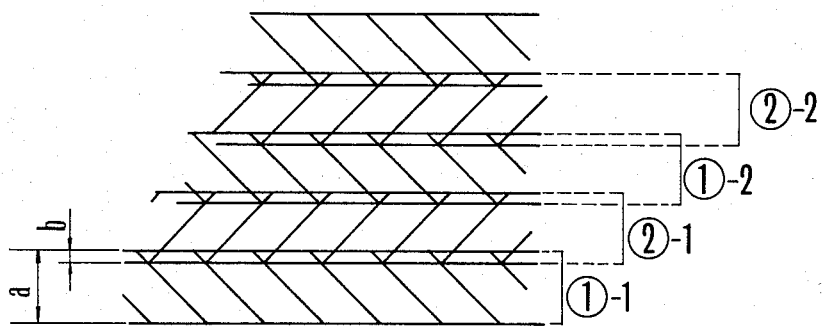
Figure 8B:
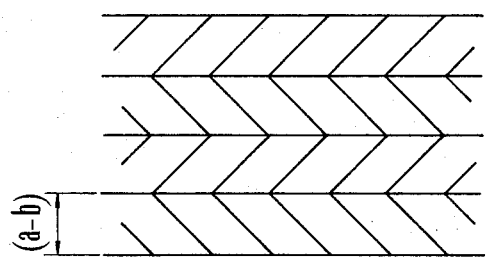
Figure 9:
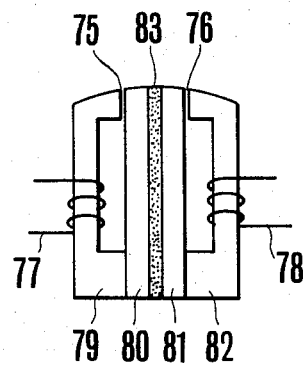

FIGS. 8(A) and 8(B) are detailed representations of recorded patterns on a magnetic tape in said example;

FIG. 9 is a representation of another example of rotating heads; and

Figure 10:
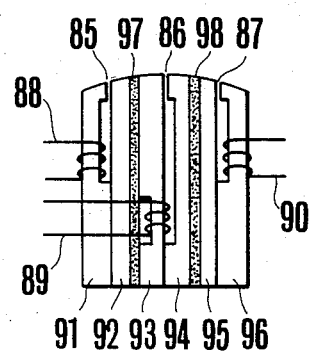

FIG. 10 is a representation of still another example of rotating heads.

DETAILED DESCRIPTION OF THE PREFERRED EMBODIMENTS

Figure 1:
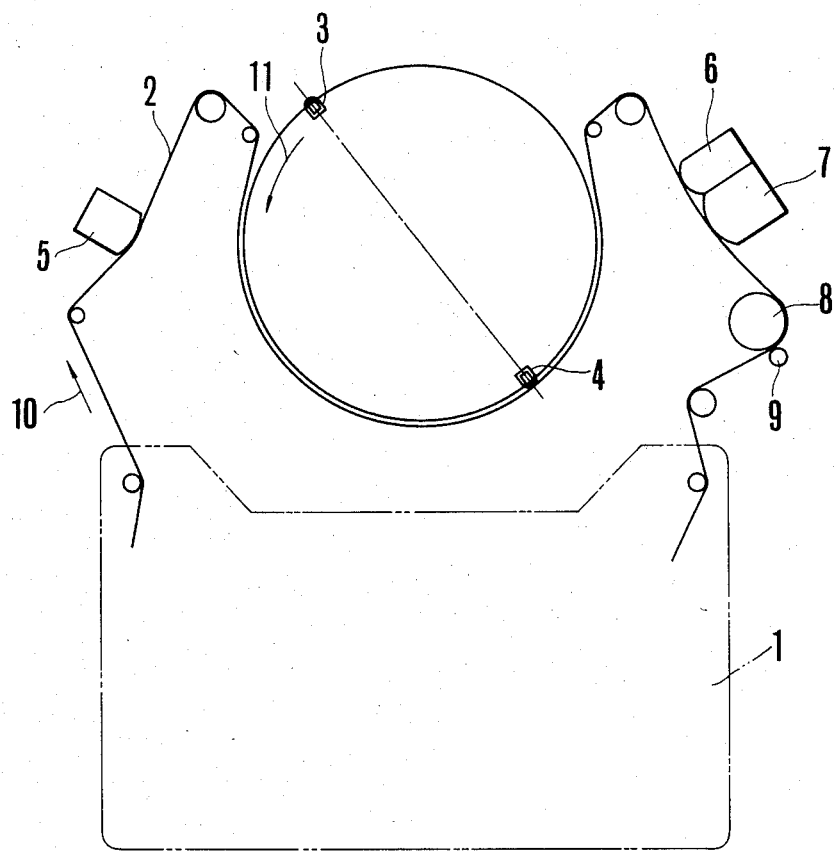
FIG. 1 is a plan view of an arrangement of a record-reproduction part to show an example of a simple type VTR according to a conventional method.
Figure 5:
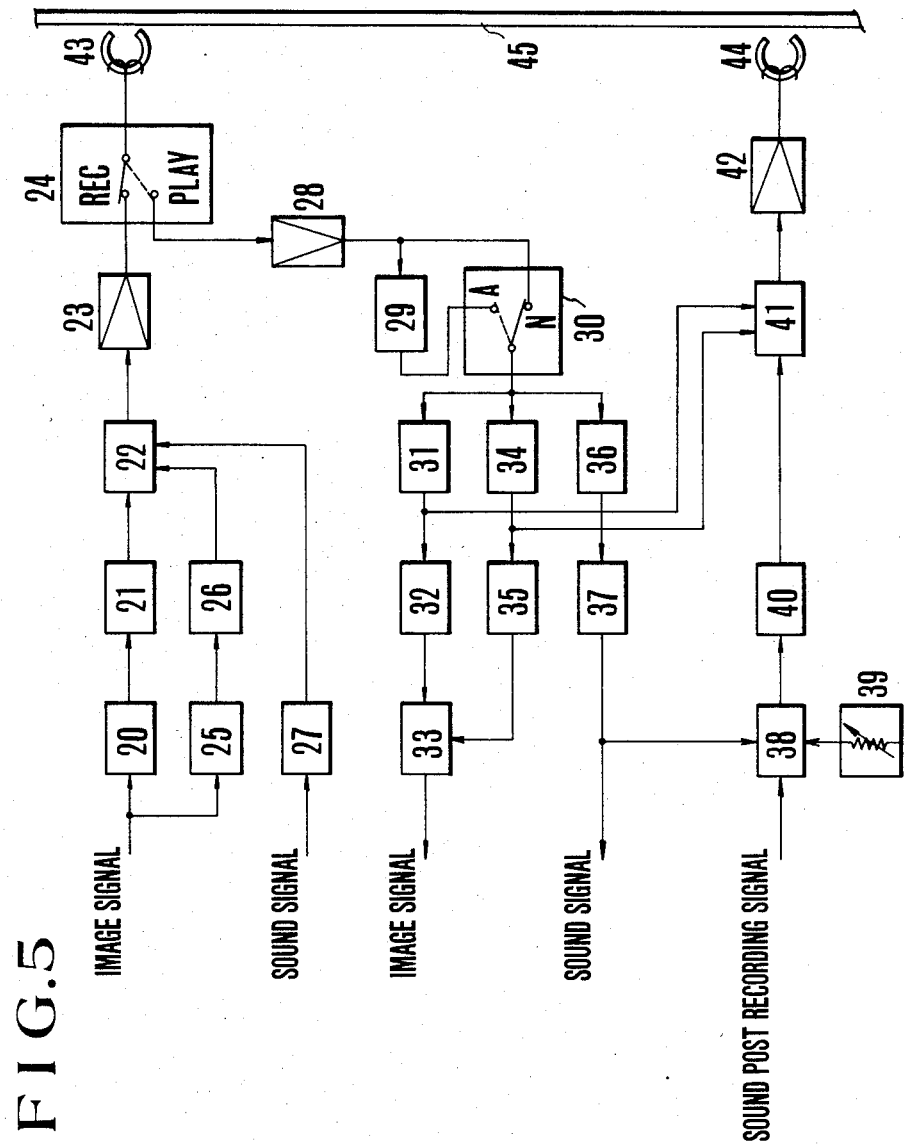
FIG. 5 is a block diagram to show a circuit arrangement of an example of the present invention.

FIG. 5 is a block diagram to show a circuit arrangement of an example of the present invention. At the time of a normal recording, an analog switch 24 for recording. reproduction change over is placed in a recording mode, and as image signals are introduced a brightness element of the image signals is taken out by a low pass filter 20 (hereinafter called as LPF) which takes out brightness signals. The LPF output is frequency modulated by an FM modulator 21, and then it is added in an adder 22. A color signal element of the image signals is taken out by a band pass filter (hereinafter called as BPF) 25, and is converted to a low zone or low band frequency by a frequency modulator 26 which modulates the color signal to a low zone which is added in the adder 22. Sound signals are frequency modulated by an FM modulator 27 and are added in the adder 22. A frequency zone of sound signals is established between the color signal zone which is converted to a low zone, and the brightness signal zone which are frequency modulated. The output of the adder 22 is sent to a picuture recording amplifier 23, goes through the analog switch 24, and then is recorded on a magnetic tape 45 by a rotating magnetic head 43.

Also, at the time of normal reproduction, the analog switch 24 is changed over to a reproduction mode, and an analog switch 30 for change over of a post recording delay signal and a normal reproduction signal is changed over to a normal reproduction position N. That is, image. sound signals reproduced by the rotating magnetic head 43 pass through the analog switch 24 and are transmitted to a reproduction amplifier 28. An output of the reproduction amplifier goes through the analog switch 30 and is sent to a high pass filter (hereinafter called as HPF) 31, and an LPF34 and a BPF36. The HPF31 operates to take out the brightness element which is frequency modulated, and an output thereof passes through an FM demodulator 32 and is entered into an adder 33. The LPF34 operates to take out the color signal element which is frequency modulated to a low zone and the color signal is returned to its original state through a frequency demodulator 35 and is added in the adder 33. At the output of the adder 33 are image signals which are then reproduced.

Further, the output of the analog switch 30 passes through the BPF36 which passes frequency modulated sound signals, and is applied to an FM demodulator 37 so that sound signals are provided from the output of the FM demodulator 37.

In the above-mentioned method, a rotating magnetic head 44 which is used solely for post recording is provided for making a post recording of sound signals, and synthesized signals of image signals and new sound signals are re-recorded along a recording locus before post recording on the magnetic tape 45.

At the time of post recording of sound signals, the change over analog switch 30 for normal reproduction and post recording is changed over to a post recording position A. Image.sound signals being reproduced by the rotating magnetic head 43 pass through the analog switch 24 and are transmitted to the reproduction amplifier 28. The output of the reproduction amplifier 28 passes through a delay device 29 and the analog switch 30, and is connected to the HPF31, the LPF34 and the BPF36. A brightness signal output from the HPF31 and a color signal output from the LPF34 are respectively added in an adder 41.

On the other hand, sound signals before post recording go through the BPF36, are demodulated by the FM demodulator 37, and then are added in an adder 38. Also, new sound signals are added in the adder 38. An adjuster 39 for the level of addition is attached to the adder 38. Therefore, the ratio of mixing of the sound signals before post recording, and the new sound signals, can be freely changed.

The output of the adder 38 is applied to a frequency modulator 40 and the output thereof is added in the adder 41, and is synthesized with image signals. The synthesized output of the adder 41 is amplified by a picture recording amplifier 42 and is recorded on the magnetic tape 45 by the rotating magnetic head 44 which is used solely for post recording. Reproduction of the post recorded signals is done by the rotating magnetic head 43.

Also, a function of the delay device 29 is to compensate a time differential generated as the magnetic heads 43, 44 deviate or differ from each other phase (time) wise. That is, the delay device 29 works so that horizontal synchronizing signals will be recorded at the same position both before post recording and after the same. By this, a reproduction can be made by the magnetic head 43 even a post recording. The delay device 29 is made of an ultrasonic delay means, a glass plate or a memory means such as CCD, BBD, etc.

Figure 6:
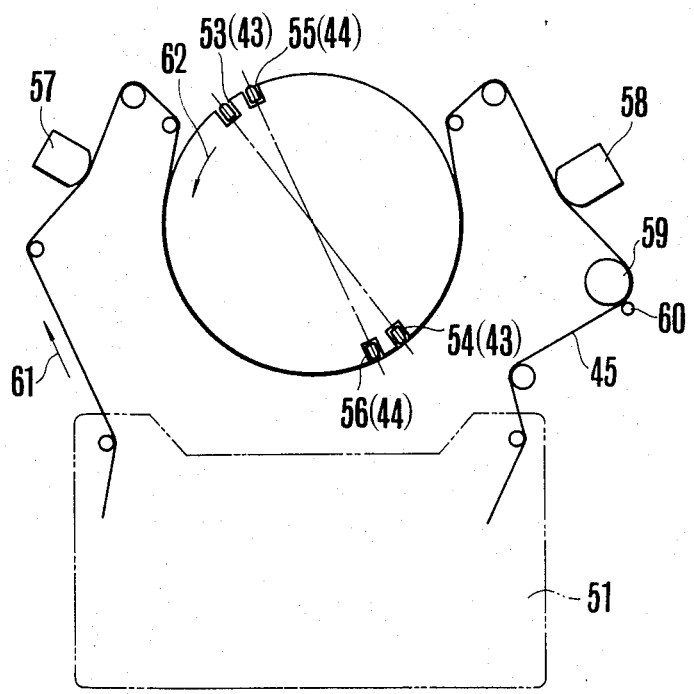
FIG. 6 is a plan view of an arrangement of a recording-reproduction part of a VTR including magnetic heads as an example of the present invention.

FIG. 6 shows an arrangement of a recording reproduction part of a VTR in which the circuit of FIG. 5 is used. A cassette 51 houses the magnetic tape 45, and rotating magnetic heads 53, 54 are for normal recording reproduction corresponding to the magnetic head 43 of FIG. 5, while rotating magnetic heads 55, 56 are used solely for post-recording corresponding to the magnetic head 44 of FIG. 5. The magnetic heads 53, 55 have the same azimuthal angle while the magnetic heads 54, 56 have the same azimuthal angle which is different from the azimuthal angle of the heads 53, 55. The rotating magnetic heads rotate with a constant speed in the direction of an arrow 62. Also shown are a capstan 60 and a pinch roller 59, wherein the magnetic tape 45 is held by pressure contacting of the capstan and the pinch roller and is fed with a constant speed in the direction of an arrow 61 by the constant speed rotation of the capstan, a total width erasing head 57, and 58 is a fixed head 58 to record and reproduce CTL (control) signals.

Figure 7:
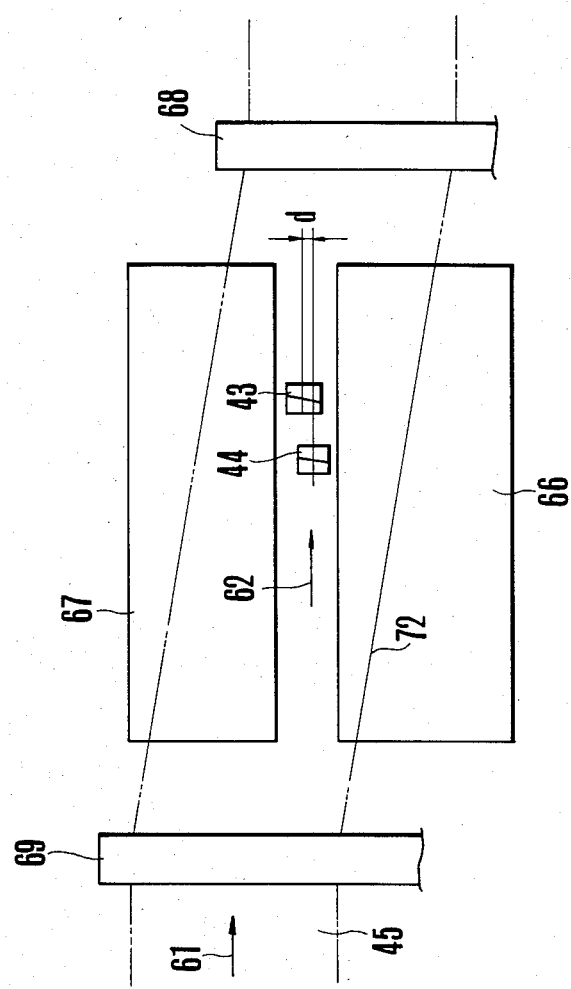
FIG. 7 is an enlarged view of the arrangement shown in FIG. 6 as viewed from the bottom of FIG. 6.

FIG. 7 shows the arrangement shown in FIG. 6 as viewed from the bottom of FIG. 6, including tape guide posts 68, 69, an upper drum 67, and a lower drum 66 having a lead plane 72.

A center line of a track formed by the magnetic head 43, and a center line of a track formed by the magnetic head 44, have a step difference d in the track direction.

This is because rotating phases of the normal recording reproduction head 43, and of the head 44 used solely for post recording, are deviated or differ from each other, and because the magnetic tape 45 always runs at a constant speed. The location of the track at which post recording is to be started is detected by the normal recording reproduction head 43. When the head 44 used solely for post recording comes to said location, a certain time has elapsed because of a deviation in the rotating phase, while the tape advances during said time, thus the track at which post recording is to be made is deviated to downwardly.

Therefore, the normal recording reproduction head 43 is shifted downward by d, corresponding to a phase deviation thereof from the magnetic head 44 used solely for post recording, so that the magnetic head 44 properly traces on a magnetic locus on which it should make a post recording. By this phase deviation and step difference, and also by combining the delay device 29 of FIG. 5, a recording can be made at a time of post recording in the same pattern as that before the post recording. That is, the phase relationship between the heads 43 and 44 can be varied to any position by varying the two other elements, the step difference and the characteristics of the delay device.

Generally speaking, in a helical scan type VTR, a recording is made in an overlapped manner with the two rotating magnetic heads 53, 54 (FIG. 6) at the time of a normal recording. This will be explained referring to FIG. 8. As shown in FIG. 8(A), a head 1 which has a certain azimuthal angle and forms a track with a width a makes a recording of 1—1. Next, a head 2 which has an azimuthal angle different from that of the head 1 and forms a track with a width a, makes a recording with an overlap by a width b with the recording 1—1. At this time the portion b which has a recording thereon by head 1, is recorded on by the head 2, and said recording by head 2 remains as a tape pattern.

Thereafter recordings will be made consecutively from 2-1 to 1-2, 2-2, 1-3, 2-3, 1-4 . . . with an overlapping of a width b.

A width of a magnetic locus remaining on the magnetic tape 45 on which recordings are made as mentioned above will have a width (a–b), being narrower by the width b than the width a of the track formed by the head as shown in FIG. 8(B). Therefore, the width of a track formed by the magnetic head used solely for post recording needs to be wider than the width (a–b) of magnetic locus remaining on the magnetic tape 45. If it is not wider, the recording before the post recording will remain, resulting in a confusion and a disturbance both in image and sound signals at the time of reproduction.

Further, when the width of a track formed by the head solely used for a post recording is too wide, the width of an adjacent magnetic locus is narrowed (if it is extremely wide the adjacent magnetic locus will be totally erased), and the reproduction output from said narrowed locus at the time of reproduction will be lowered. In view of the same, the width of a track formed by the head solely used for a post recording needs to be made wider than a width of the magnetic locus remaining on the magnetic tape 45 at the time of a normal recording, and at the same time it needs to be made narrower than the width of the track formed by the normal recording heads 53, 54. That is, a width of a track formal by the head solely used for a post recording needs to be within a range of $(a-b) \leq A \leq a$.

And the step difference d in FIG. 7 is so set that the above-mentioned width A stretches over the width (a-b) of magnetic locus of a normal recording, so that any recording before the post recording will not remain.

In the above described example, rotating magnetic heads for normal recording reproduction and rotating magnetic heads solely used for post recording are made as separate bodies, but such an arrangement will require four heads, taking a lengthy time for assembly and adjustment. FIG. 9 and FIG. 10 show examples in which said two heads are made as combination heads. The relationship of the step difference and the width of track formed will not be different from that in the former example in which said two heads are made as separate bodies.

FIG. 9 shows an example in which normal recording reproduction heads and heads solely used for a post recording are made as combination heads, showing respectively a normal recording reproduction gap 75 and a gap 76 solely used for a post recording, and cores 79, 80, 81, 82 made of, for example, ferrite material. The cores 80, 81 are welded together by low permeability material, for example, glass 83 or the like. A coil 77 is wound around the core 79 for supplying recorded signals or obtaining reproduced signals, and a coil 78 is wound around the core 82 to supply post recording signals.

Further, in the former example, re-recording is done by the magnetic head 44 having the same azimuthal angle as that of the magnetic head 43, on the track having a recording thereon with a certain azimuthal angle by the head 43, in such manner as to follow said track. That is, an arrangement wherein post recording is made in the form of an overlapped writing is employed. However, it is also possible to provide an erasing head between the magnetic head 43 and the magnetic head 44 before the head 44, so that a recorded locus is erased and sound.image synthesized signals having new sound signals added thereto are recorded by the magnetic head 44.

FIG. 10 shows an example of combination heads in which erasing heads are provided for the arrangement shown in FIG. 9, showing respectively gaps 85, 86, 87 for a normal recording reproduction, erasing and a post recording, and cores 91, 92, 93, 94, 95, 96 made of, for example, ferrite material. The cores 92 and 93 as well as the cores 94 and 95 are welded together by low permeability material, for example, glass shown 97, 98 or the like.

Also, a coil 88 is wound around the core 91 for supplying recorded signals or for obtaining reproduction signals, and a coil 89 is wound around the core 93 to supply erasing signals at the time of a post recording. Further, a coil 90 is wound around the core 96 to supply post recording signals. Thus, by using combination heads, assembling and adjusting time can be shortened.

As has been explained above by examples, in the present invention, signals obtained by mixing or selecting reproduced information from a recording medium on which a recording has been made, and new information, can be recorded at a position at which said reproduced information was recorded in almost the same manner, thus allowing a post recording of information.

Therefore, even when information on a recording medium without a post recording, and information having been post recorded by the present invention, are reproduced in succession, there will be no confusion or disturbance of information and an editing of information can be done in a very satisfactory manner.

Also, when normal recording reproduction heads and heads solely used for post recording are made integrally as shown in the latter examples, an assembly and an adjustment of the apparatus can be made simply as in an apparatus having no heads solely used for a post recording.

What is claimed is:

1. A video tape recorder, comprising:
   mixing means to obtain mixed signals by mixing image signals and sound signals;
   recording means coupled to said mixing means to record said mixed signals on a portion of a tape form recording medium; and
   post recording means to make a post recording of sound signals at the portion of the recording medium at which the mixed signals have been recorded;
   the tape form recording medium being a magnetic tape and the recording means containing first rotating magnetic head means including at least one magnetic head;
   the recording means further including a guide body for contacting and guiding the magnetic tape and transporting means to transport the magnetic tape while the magnetic tape is guided by the guide body, a recording being arranged to be made of the mixed signals over an oblique magnetized locus on the magnetic tape by the first rotating magnetic head;
   the post recording means comprising second rotating magnetic head means including at least one magnetic head for post recording on the magnetic tape;
   the width of a track formed by the second rotating magnetic head means being narrower than the width of a track formed by the first rotating magnetic head means and wider than the width of said magnetized locus.

2. A video tape recorder according to claim 1, in which the magnetic heads of the second rotating magnetic head means and the first rotating magnetic head means are supported by a common rotatable shaft and have corresponding rotating phases which differ from each other.

3. A video tape recorder, comprising:
mixing means to obtain mixed signals by mixing image signals and sound signals;
recording means coupled to said mixing means to record said mixed signals on a portion of a tape form recording medium;
post recording means to make a post recording of sound signals at the portion of the recording medium at which the mixed signals have been recorded;
the tape form recording medium being a magnetic tape and the recording means containing first rotating magnetic head means including at least one magnetic head;
the recording means further including a guide body for contacting and guiding the magnetic tape and transporting means to transport the magnetic tape while the magnetic tape is guided by the guide body, a recording being arranged to be made of the mixed signals over an oblique magnetized locus on the magnetic tape by the first rotating magnetic head;
the post recording means comprising second rotating magnetic head means including at least one magnetic head for post recording on the magnetic tape;
the width of a track formed by the second rotating magnetic head means being narrower than the width of a track formed by the first rotating magnetic head means and wider than the width of said magnetized locus;
the magnetic heads of the second rotating magnetic head means and the first rotating magnetic head means being supported by a common rotatable shaft and having corresponding rotating phases which differ from each other; and
the magnetic heads of the second rotating magnetic head means and the first rotating magnetic head means having corresponding planes of rotation which are separated from one another in the direction of the rotatable shaft.

4. A video tape recorder according to claim 3, in which the post recording means further comprises compensation means for compensating for time deviation between signals recorded by said post recording means and the mixed signals, which time deviation results from the difference between the rotating phases of the magnetic heads and the separation of the planes of rotation of the heads in the axial direction of the rotatable shaft.

5. A video tape recorder according to claim 4, in which the compensation means contains a delay circuit.

6. A video tape recorder according to claim 3, in which the first rotating magnetic head means and the second rotating magnetic head means are integrally formed.

7. A video tape recorder according to claim 3, which further comprises a rotating erasing head to erase the magnetized locus formed by the first rotating magnetic head means just before the second rotating magnetic head means makes a post recording.

8. A video tape recorder according to claim 7, in which the rotating erasing head is provided between the first rotating magnetic head means and the second rotating magnetic head means.

9. A video tape recorder according to claim 8, in which the first rotating magnetic head means, the second rotating magnetic head means and the rotating erasing head are integrally formed.

10. An information signal recording and reproducing apparatus, comprising:
(a) a first rotating head for reproducing a first information signal from recording tracks of a recording medium; and
(b) a second rotating head for recording a second information signal on the recording tracks at the same time as the first rotating head reproduces the first information signal from the recording tracks, the second rotating head being arranged to track the first rotating head, and the width of a track formed by the second rotating head being narrower than the width of the track formed by the first rotating head and wider than the width of the recording tracks.

11. An apparatus according to claim 10, wherein the first and second information signals each include video signals.

12. An apparatus according to claim 10, wherein the recording medium includes a magnetic tape.

13. An apparatus according to claim 12, further comprising:
moving means for moving the magnetic tape in a direction to cross the rotating surfaces of said first and second rotating heads.

14. An apparatus according to claim 13, wherein the width of the recording tracks is determined by the speed the magnetic tape is moved by the moving means.

15. A composite signal recording and reproducing apparatus, comprising:
(a) a first rotating head for reproducing a first composite signal which includes a first information signal and a second information signal from recording tracks of a recording medium;
(b) separation means for separating the first information signal from the reproduced first composite signal;
(c) mixing means for obtaining a second composite signal by mixing the first information signal and a third information signal; and
(d) a second rotating head for recording the second composite signal on the recording medium, the second rotating head being arranged so as to track the first rotating head, and the width of a track formed by the second rotating head being narrower than the width of the track formed by the first rotating head and wider than the width of the recording tracks.

16. An apparatus according to claim 15, wherein the second rotating head and the first rotating head have a same rotating shaft but have their rotating phases deviating from each other.

17. An apparatus according to claim 16, wherein the second rotating head and the first rotating head have their rotating planes deviating in the direction of the rotating shaft.

18. An apparatus according to claim 15, further comprising:
a rotating erasing head for erasing the first composite signal recorded on the recording tracks.

19. An apparatus according to claim 18, wherein the rotating erasing head is provided between the first rotating head and the second rotating head.

* * * * *